Patented July 5, 1949

2,474,966

UNITED STATES PATENT OFFICE 2,474,966

METHOD OF PREPARING SELENIUM

Nicolaas Willem Hendrik Addink and Maarten Hekelaar, Eindhoven, Netherlands, assignors, by mesne assignments, to Hartford National Bank and Trust Company, Hartford, Conn., as trustee No Drawing. Application May 9, 1946, Serial No. 668,467. In the Netherlands May 1, 1941

Section 1, Public Law 690, August 8, 1946
Patent expires May 1, 1961

3 Claims. (Cl. 175—366)

It is known that the electrical properties of selenium, which are important for the use of selenium in photo-electric cells, rectifiers or the like can be altered by adding small quantities of certain materials. Thus, for instance, the crystalline selenium forming part of a selenium rectifier is often made electrically conductive by mixing pure selenium, which by itself is not electrically conductive, in the molten state with a small quantity of volatile halide and by causing the molten selenium thus prepared to crystallise under definite conditions.

When it is desired that molten selenium mixed with the said admixtures should not be directly used for the manufacture of rectifiers or the like, but should be solidified and conserved for a long time in the said state so as to compose a stock from which may be taken at all times when requiring selenium for the use in rectifiers or the like, it sometimes appears that the ability for the said use is eventually lost.

It has now been found that the prepared solidified selenium eventually looses its ability for use in rectifiers or the like solely if it is in the crystalline state, which is probably due to the fact that the selenium is comparatively porous in this state, so that air and aqueous vapour may readily react with the admixtures and may render them inoperative. If, however, it is conserved in the non-crystalline solid state, in which it may be conceived to constitute an undercooled liquid and in which it constitutes a compact non-porous mass, it is capable of conserving its ability for the said uses for an optional time; in this case the non-crystalline selenium, briefly called amorphous selenium hereinafter, may at all times be converted into the conductive crystalline state.

In the present case the expression "crystalline state" is to be understood to mean the crystalline state into which molten selenium may pass upon cooling if it is left to itself; in this state the selenium is comparatively porous, in contradistinction to the state of the selenium forming part of rectifiers or the like which is crystallised out therein in such manner that its electrical properties can be conserved for an optional time.

When making use of selenium it is very disagreeable in practice that in working with large quantities the molten selenium often passes over into the crystalline state upon solidification in which it cannot be conserved, so that the formation of the amorphous state cannot be sufficiently controlled.

In this respect it is to be remarked that on cooling rapidly selenium passes over into the amorphous state, it is true, but this occurs only in the case of such a small quantity of selenium that it does not enter into account for practical use in regard to the present problem.

For the present invention the attempts are directed to the obtainment of selenium always in the amorphous state in which we succeed, according to the invention, by treating selenium at a temperature above its melting point with a material capable of reducing selenium dioxide under these conditions, such as ammonia, hydrogen, lighting gas, monoxide of carbon, ammonium chloride. It appears that selenium treated according to the invention always passes over into the amorphous state upon cooling. In this respect it is to be remarked, however, that the molten selenium treated according to the invention should not be cooled too slowly. Hence, the invention does not apply to an extremely large quantity of selenium, for instance exceeding a ($\frac{1}{2}$ m.)$^3$, since the cooling of such large masses often takes place so slowly, particularly in the interior of the mass, that crystallisation may eventually still occur.

To explain the remarkable result obtained by the invention it may be postulated that selenium contains traces of selenium dioxide which promote the establishment of a crystalline phase. By treating according to the invention this oxide would then be reduced to selenium thus removing the impediment to the formation of a non-crystalline phase. Although it has been found, as stated above, that the purpose of the invention is attained by the above treatment of molten selenium with a material reducing selenium dioxide, we do not wish the invention to be bound to this theory.

The invention is of particular importance in regard to very pure selenium designed for use in photo-electric cells and in rectifiers, since, as has already been said, this pure selenium, after having been prepared in the molten state with definite admixtures, may eventually lose its ability for use in rectifiers or the like, if it has passed over into the crystalline state upon solidification. When this pure selenium is treated according to the invention, before mixing it in the molten state with the said admixtures, it appears to pass over into the amorphous state upon solidification, in which it may conserve its ability for the said use for an optional time, provided that, as has already been observed, no extremely large quantity is treated. In this case it is advisable to use a material which is capable of reducing selenium dioxide with the formation of gaseous reaction products and is gaseous by itself, and to degasify the selenium melt as thoroughly as possible after the treatment, for instance by keeping it under vacuum for some time or by stirring intensively. In fact, by such a treatment no impurities are left in the selenium, which might affect an accurate dosage of the admixtures due to possible reaction with the latter.

If desired, the invention may be used for raw selenium. If raw selenium prepared, for instance, from selenium mud of sulphuric acid works or the anode mud of copper refineries is treated according to the invention the treated selenium melt also passes over into the amorphous state upon solidification.

Example

Gaseous ammonia is passed at a speed of about 40 ccm. a minute through 400 gms. of pure selenium at a temperature of about 100° C. above its melting point for 20 minutes. After this operation the molten selenium is kept under vacuum for some time, say about 10 minutes, whereupon a small quantity of a volatile halide, for instance about 0.1% by weight of tungsten hexachloride is added, followed by cooling, the selenium passing over into the amorphous state and lending itself to be used at all times for the manufacture of a selenium rectifier.

What we claim is:

1. A method of preparing amorphous solid selenium comprising the steps of heating selenium to a temperature in excess of the melting point of selenium, passing gaseous ammonia through the molten selenium for reducing selenium dioxide in the molten selenium, heating and degassifying the selenium in a vacuum, adding a small quantity of tungsten hexachloride to improve the conductivity of the selenium, and cooling the selenium.

2. A method of preparing amorphous solid selenium comprising the steps of heating selenium to a temperature of approximately 100° C. above its melting point, passing gaseous ammonia through the molten selenium for reducing selenium dioxide in the molten selenium, heating and degassifying the selenium in a vacuum, adding a small quantity of tungsten hexachloride to improve the conductivity of the selenium, and thereafter cooling the selenium.

3. A method of preparing amorphous solid selenium comprising the steps of heating approximately one-half a cubic millimeter of selenium to a temperature approximately 100° C. above its melting point, passing gaseous ammonia through the molten selenium for reducing selenium dioxide therein, heating and degassifying the selenium in a vacuum, adding a small quantity of tungsten hexachloride to improve the conductivity of the selenium, and thereafter cooling the selenium.

NICOLAAS WILLEM HENDRIK ADDINK.
MAARTEN HEKELAAR.

REFERENCES CITED

The following references are of record in the file of this patent:

UNITED STATES PATENTS

| Number | Name | Date |
|---|---|---|
| 1,415,526 | Chikashinge et al. | May 9, 1922 |
| 1,456,532 | Brown | May 29, 1923 |
| 1,915,703 | Towne et al. | June 27, 1933 |
| 2,111,112 | Dudley | Mar. 15, 1938 |
| 2,162,613 | Emmens et al. | June 13, 1939 |
| 2,255,358 | Jackson et al. | Sept. 9, 1941 |

OTHER REFERENCES

Klein, Paper read at Society of Chemical Industry, pages 10 and 18, Nov. 20, 1908.

Mellor, Comprehensive Treatise on Inorganic and Theoretical Chemistry, vol. 10, pp. 700, 702, 703, 707, 811 (1930), Longmans Green & Co.